United States Patent [19]

Yasuhara et al.

[11] Patent Number: 4,747,672

[45] Date of Patent: May 31, 1988

[54] LIGHT COMPENSATING LIQUID CRYSTAL DISPLAY

[75] Inventors: Isao Yasuhara; Shunichi Kusumi, both of Nagaoka, Japan

[73] Assignee: Nippon Seiki Co., Ltd., Niigata, Japan

[21] Appl. No.: 849,429

[22] Filed: Apr. 8, 1986

[30] Foreign Application Priority Data

Apr. 26, 1985 [JP] Japan .................................. 60-91973
May 27, 1985 [JP] Japan ............................. 60-79547[U]
Jul. 31, 1985 [JP] Japan ........................... 60-117855[U]

[51] Int. Cl.$^4$ ................................................ G02F 1/13
[52] U.S. Cl. .................................... 350/345; 350/338
[58] Field of Search ............... 350/337, 338, 334, 345; 340/700, 784

[56] References Cited

U.S. PATENT DOCUMENTS 4,367,923 1/1983 Ishikawa ............................ 350/345
4,403,216 9/1983 Yokoi .................................. 340/700

FOREIGN PATENT DOCUMENTS

5336981 12/1981 Japan .

Primary Examiner—Stanley D. Miller
Assistant Examiner—Trong Quang Phan
Attorney, Agent, or Firm—Lowe, Price, LeBlanc, Becker & Shur

[57] ABSTRACT

In the present invention, a first arm piece for fixing a liquid crystal display element and a second arm piece for fixing a reflecting plate are interconnected at their base portions to form a frame, and a printed circuit board which carries thereon a liquid crystal display element driving circuit connected electrically to the liquid crystal display element is fixed to the back of the reflecting plate, in which construction the angle between the liquid crystal display element and the reflecting plate can be set and maintained stably. Further, a light conductor is disposed on a rear face side of the liquid crystal display element and a light transmission control member is disposed on a rear surface of the light conductor whereby an internal light emitted from an internal light source for illumination of the liquid crystal display element is prevented from leaking to the observer side, that is, it can be conducted in a direction not obstructing the observer's sight.

9 Claims, 7 Drawing Sheets

LIGHT COMPENSATING LIQUID CRYSTAL DISPLAY

BACKGROUND OF THE INVENTION

1. Field of the Invention

The present invention relates to a liquid crystal display device in which a light conductor is disposed on a rear face side (rear surface) of a transmission type liquid crystal display element, which display element is illuminated, through the light conductor, with an internal light emitted from a light source or with an external light entering through a light transmitting window provided above the light conductor, and a display image as a virtual image reflected by a reflecting plate which is disposed inclinedly on a front face side of the liquid crystal display element, is seen.

2. Description of the Prior Art

In Japanese Utility Model Publication No. 53369/81 issued by the Japanese Patent Office there is disclosed a device in which light is directed to a transmission type liquid crystal display element from a rear side of the same element, then transmitted light is reflected by a reflecting plate, and a display image on the reflecting plate is seen from a display window formed in a frame.

Figure 9:
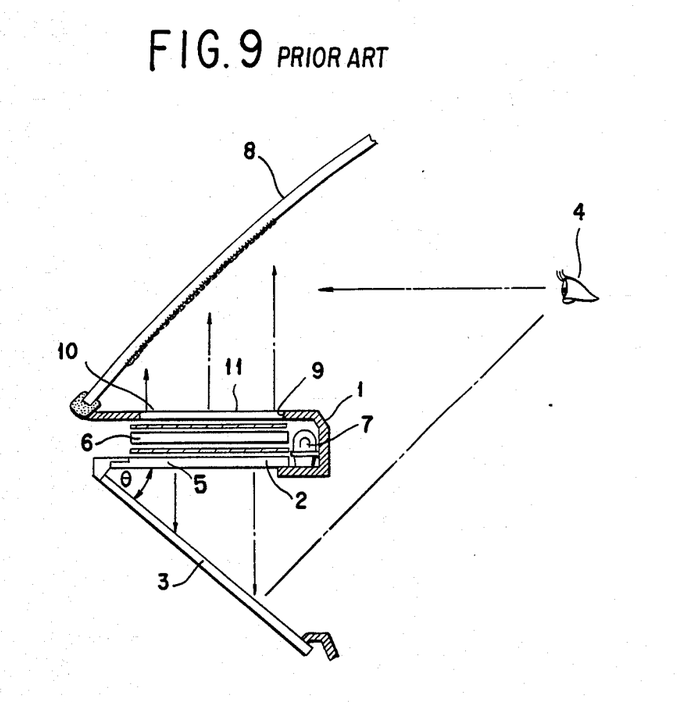
FIG. 9 is a sectional view of a principal portion of a conventional liquid crystal display device.

This liquid crystal display device is used, for example, in a vehicle in such a mode as shown in FIG. 9, in which a transmission type liquid crystal display element 2 is attached horizontally to a vehicular hood 1 and on a front face side of the display element 2 there is disposed a reflecting plate 3 opposedly and inclinedly at a predetermined angle $\theta$ so that a reflected display image can be seen by a driver 4 as an observer, while on a rear face side of the liquid crystal display element 2 is disposed a light conductor 6 through a color filter. When the surroundings are dark, for example, during the night, an internal light from a light source 7 is conducted by the light conductor 6 and passes through the color filter 5, while when the surroundings are light, for example, during the daytime, an external light entering from a front glass 8 passes through the light conductor 6 and the color filter 5 through a diffusion plate 10 fitted in a light transmitting window 9 which is formed in an upper surface of the hood 1, thereby illuminating the liquid crystal display element 2.

Futher, on a rear face side of the light conductor 6, that is, on the side of the light conductor 6 opposite to its side facing the liquid crystal display element 2, there is provided a semi-transmissible reflection member 11, e.g. a half mirror or a bright color ink layer, with a view to not only reflecting the internal light incident on the interior of the light conductor 6 from the light source 7, positively toward the liquid crystal display element 2 but also transmitting the external light to the same side.

In this liquid crystal display device, a virtual image on the reflecting plate 3 is seen, so in comparison with a display device of the type in which the liquid crystal display element 2 is seen directly, the display image so far reflected toward the observer may deviate largely due to a slight dislocation of the display element 2 or the reflecting plate 3, and thus it is difficult to effect positioning. Particularly, where the liquid crystal display device is to be incorporated in a vehicular meter which undergoes frequent vibrations, since in the above prior art the liquid crystal display element 2 and the reflecting plate 3 are fixed separately to the meter case, it is difficult to set the angle $\theta$ between the display element 2 and the reflecting plate 3 at the time of assembly, or the said angle $\theta$ may vary due to vibrations or distortion of the meter case even after assembly and in this case there is fear that the display image will not be reflected toward the eyes of the driver 4

If the light source 7 is turned ON during the night, not only this light will be reflected toward the liquid crystal display element 2 by the light conductor 6 but also a portion thereof will pass through the semi-transmissible reflection member 11 and leak above toward the diffusion plate 10, so that the diffusion plate 10 lights, or the light passes through the diffusion plate and is reflected on the front glass 8, thus obstructing the sight of the driver 4.

SUMMARY OF THE INVENTION

The present invention has been effected in view of the above problems and it is an object thereof to provide a liquid crystal display device in which a liquid crystal display element and a reflecting plate are of an integral construction, whereby assembly can be done easily and the angle between the liquid crystal display element and the reflecting plate can be kept constant, thereby permitting a display image to be reflected accurately toward the eyes of the observer.

It is another object of the present invention to provide a vehicular liquid crystal display device in which an internal light leaking above the display device is conducted in a direction in which it does not obstruct the observer's sight, thereby preventing the leaking light from obstructing the vehicular driving.

DETAILED DESCRIPTION OF THE PREFERRED EMBODIMENTS

Figure 1:
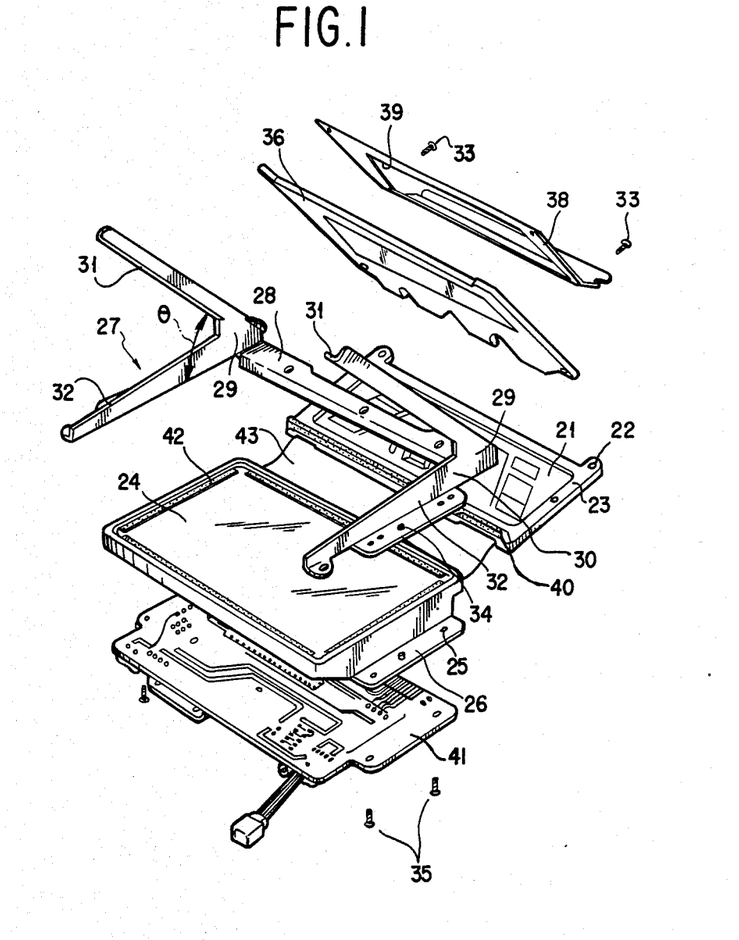
FIG. 1 is an exploded perspective view of a principal portion of a liquid crystal display device according to a first embodiment of the present invention.
Figure 2:
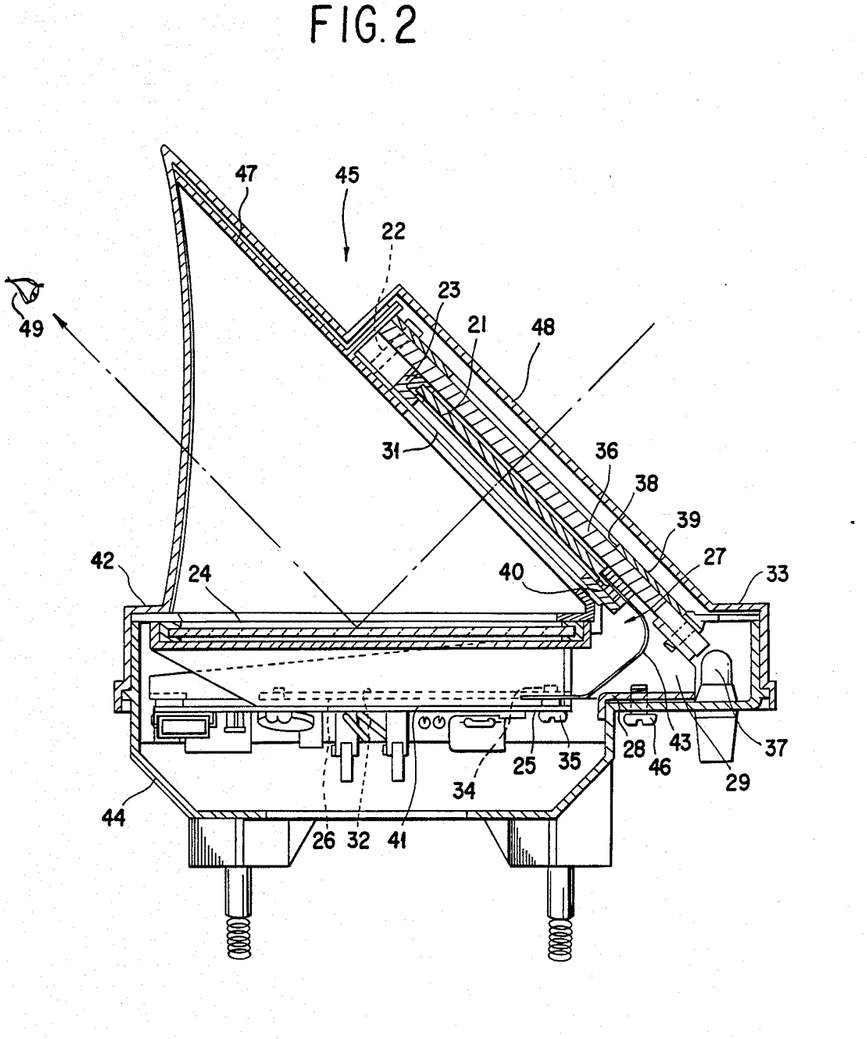
FIG. 2 is a sectional view of a principal portion of an indicating instrument incorporating therein the liquid crystal display device of the first embodiment.

FIGS. 1 and 2 illustrate a first embodiment of the present invention, in which a transmission type liquid crystal display element 21 is fitted in a mounting frame 23 having bolt holes 22 formed in suitable positions. Numeral 24 denotes a reflecting plate fitted in a mounting frame 26 which has bolt holes 25 formed in suitable positions.

The liquid crystal display element 21 and the reflecting plate 24 are fixed at a predetermined angle by means of a metallic frame 27. The frame 27 comprises two arms whose base portions 29 are interconnected through a connecting member 28. The arms 30 are each provided with an upper arm piece 31 as a first arm piece and a lower arm piece 32 as a second arm piece, both arm pieces having free ends extending at an angle of $\theta$ from the base portion 29. The upper arm pieces of the arms 30 are formed with bolt holes (not shown) in positions corresponding to the bolt holes 22 of the mounting frame 23 for the liquid crystal display element 21, and the display element 21 is put on the arm pieces 31 and it can be secured to the latter threadedly with bolts 33. The lower arm pieces 32 of the arms 30 are also formed with bolt holes 34 in positions corresponding to the bolt holes 25 of the mounting frame 26 for the reflecting plate 24 so that the reflecting plate 24 can be secured to the arm piece 32 threadedly with bolts 35 in opposed relation to the liquid crystal display element 21

Numeral 36 denotes a light conductor formed of a transparent light conductive synthetic resin material, e.g. polycarbonate resin or acrylic resin, and positioned on a rear face side of the liquid crystal display element 21. The light conductor 36 functions to conduct light rays from a light source 37 to the entirety of the liquid crystal display element 21 when the light source 37 is turned ON during the night. Numeral 38 denotes a holder for holding down a rear face of the light conductor 36, the holder 38 being constituted by material having a reflecting function, e.g. aluminum plate. The holder 38 is formed with a light transmitting window 39 for conducting an external light to the liquid crystal display element 21 through the light conductor 36. At the time of fixing the liquid crystal display element 21 to the arms 30, the light conductor 36 and the holder 38 are also attached thereto threadedly with bolts 33. In this case, a packing 40 is disposed on the front face side of the mounting frame 23 to cushionwise fix the upper arms 31 and the display element 21 together.

Numeral 41 denotes a printed circuit board having various electronic parts mounted on the back thereof which electronic parts constitute a drive circuit for the liquid crystal display element 21. At the time of fixing the reflecting plate 24 to the lower arm pieces 32, the printed circuit board 41 is positioned on the back of the reflecting plate 24 and is also fixed to the lower arm pieces 32 with bolts 35. In this case, lower ends of the arm pieces 32 and the reflecting plate 24 are cushionwise fixed together through a packing 42 disposed on a front face of the reflecting plate 24. Further, the printed circuit board 41 is electrically connected to the liquid crystal display element 21 through a flexible cord 43 and is also connected electrically to various meter bodies (not shown) through electric cords.

In FIG. 2, numeral 44 denotes a lower case of an indicating instrument 45 which houses therein the liquid crystal display device of the present invention. After the components shown in FIG. 1 are fixed to the frame 27, the connecting member 28 of the frame 27 is fixed to the lower case 44 with bolts 46. Numeral 47 denotes a hood serving as a shield against light incident from above and numeral 48 denotes an upper case which covers the whole of an upper portion of the indicating instrument 45 and which is made of a transparent synthetic resin material. The upper case 48, which is fitted on the lower case 44, not only serves as a front cover for the indicating instrument 45 but also functions to transmit an external light to the light conductor 36.

In the device of the present invention thus constructed, the frame 27 is formed by a pair of right and left arms 30 each having arm pieces 31 and 32 which extend at the predetermined angle $\theta$, and the connecting member 28 which interconnects the paired arms 30 at the base portions 29 thereof. On an upper surface side of the frame 27 are fixed the liquid crystal display element 21 as well as the holder 38 and the light conductor 36, while on a lower surface side of the frame 27 the reflecting plate 24 is fixed together with the printed circuit board 41, allowing the display element 21 and the reflecting plate 24 to be opposed to each other at the predetermined angle $\theta$. Thus the components of the liquid crystal display device are rendered integral with respect to the frame 27. Under this construction, the angle $\theta$ between the liquid crystal display element 21 and the reflecting plate 24 can be maintained constant by the paired arms 30 and the operation required for setting the angle becomes unnecessary, thus facilitating the assembling work. What is required is only assembling the liquid crystal display device as an integral body with respect to the frame 27 and fixing the connecting member 28 to the lower case 44 of the indicating instrument 45. Thus the positioning of the liquid crystal display device relative to the indicating instrument 45 is easy. Further, since the frame 27 in this assembly is metallic and so strong, the angle $\theta$ is maintained constant without being influenced by the distortion of the lower case 44, thus permitting the display image to be directed accurately toward the eyes of the observer or the driver 49. Besides, the angle $\theta$ is not changed even by vibrations.

Figure 3:
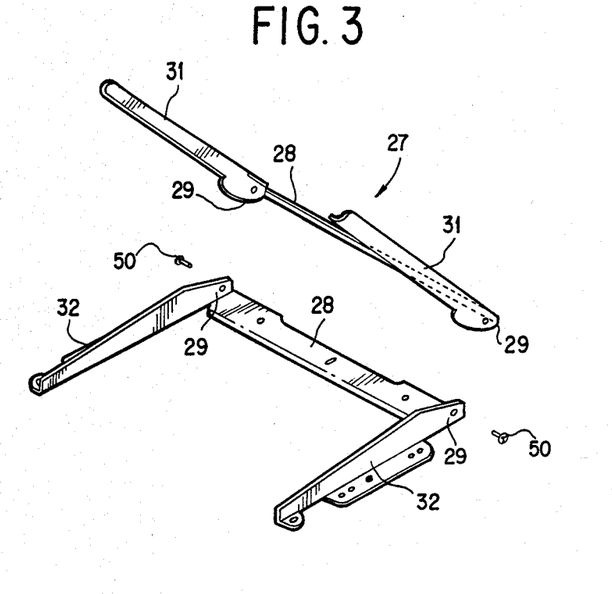
FIG. 3 is an exploded perspective view of a principal portion of a liquid crystal display device according to a second embodiment of the present invention.
Figure 4:
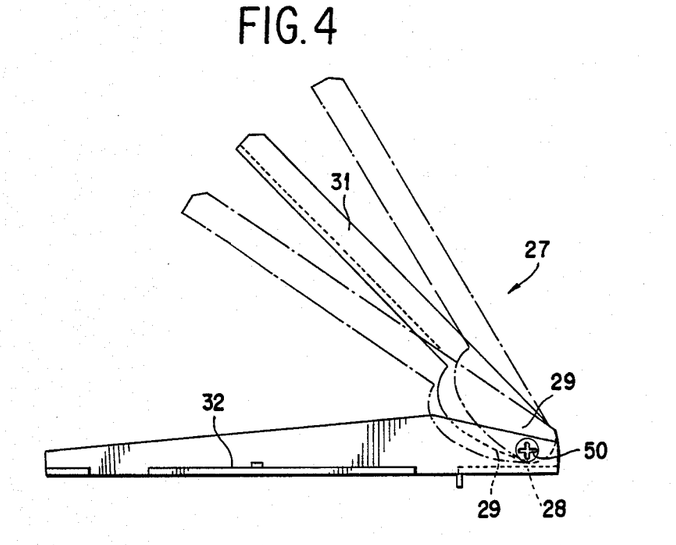
FIG. 4 is a side view thereof.
Figure 5:
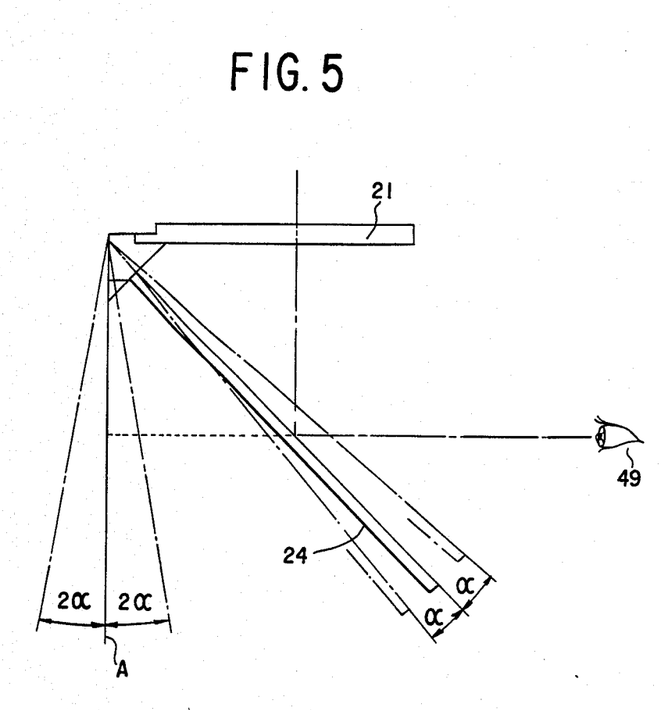
FIG. 5 is an explanatory view showing the formation of a virtual image.

FIGS. 3 to 5 illustrate a second embodiment of the present invention which is a modification of the above embodiment. Although the frame 27 shown in FIGS. 1 and 2 has a fixed angle $\theta$, if as shown in FIGS. 3 and 4 the frame 27 is divided into a set of upper arm pieces 31 and a set of lower arm pieces 32 and the respective base portions 29 are connected through bolts 50, then the angle can be set at any desired value. Even if the mounting angle of the indicating instrument 45 shown in FIG. 2 varies depending on the type of vehicle to which the meter 45 is to be attached, the display image on the liquid crystal display element 21 can be directed toward the eyes of the driver 49 as shown in FIG. 5 by presetting the angle $\theta$ at an appropriate value according to the type of vehicle to which the meter is to be attached. In this case, the driver 49 sees a virtual image A on the rear face of the reflecting plate 24, so if the angle of the reflecting plate 24 is changed by $\alpha$, the displacement angle of the virtual image A becomes $2\alpha$, so a small variable angle of the reflecting plate 24 suffices. Although in FIG. 3 the arm pieces 31 and 32 are connected with bolts 50, the angle can be changed as desired even by using any other suitable means, for example, with a screw driver from the outside of the indicating instrument.

Figure 6:
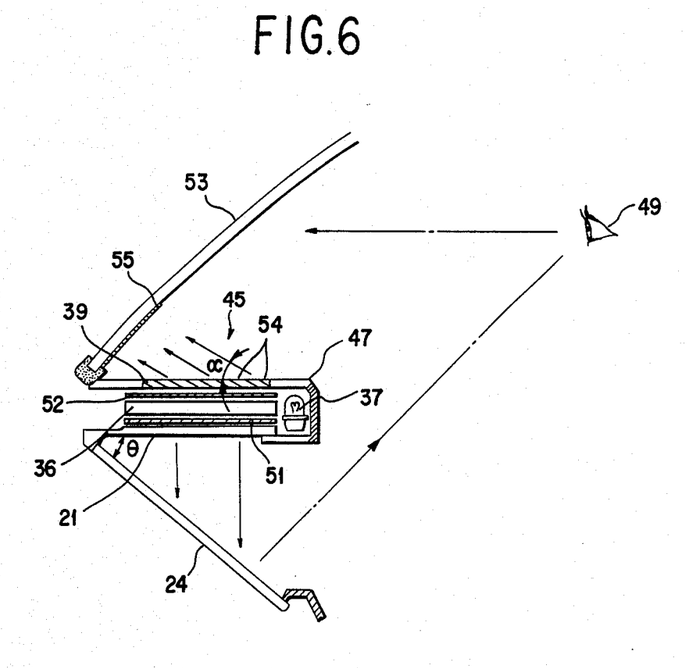
FIG. 6 is a sectional view of a principal portion of a liquid crystal display device according to a third embodiment of the present invention.
Figure 7:
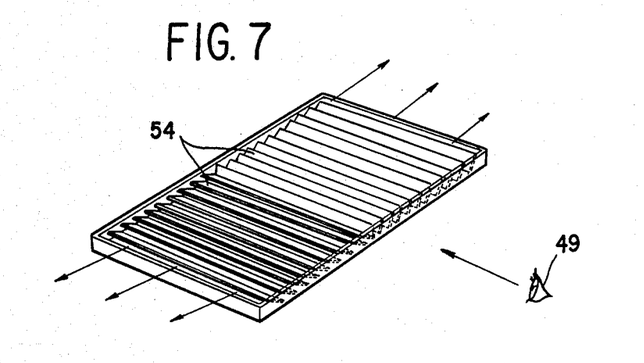
FIG. 7 is a sectional view of a principal portion of a modification thereof.

Referring now to FIGS. 6 and 7, there is illustrated a third embodiment of the present invention, in which a transmission type liquid crystal display element 21 is disposed approximately horizontally in a hood 47 on the vehicular front side, and on a front face side of the display element 21 there is disposed a reflecting plate 24 oppositely and inclinedly at an angle of $\theta$ relative to the display element so that the driver 49 can see a display image on the display element 21 reflected by the reflecting plate 24. Disposed on a rear face side (rear surface) of the liquid crystal display element 21 is a color filter 51, and on a rear face side of the color filter 51 is disposed a light conductor 36 whereby an internal light emitted from a light source 37 when turned ON, for example, during the night, is conducted toward the liquid crystal display element 21. Moreover, a semi-transmissible reflection member 52 is provided on a rear face of the light conductor 36. Further, a light transmitting window 39 for introducing an external light from a front glass 53 is formed in the hood 47 on an upper surface side of the light conductor 36. Plural strips 54 which serves as a light transmission control member for restricting the advancing direction of light are arranged approximately in parallel in the light transmitting window 39, the strips 54 being inclined at an angle of $\alpha$ on the side opposite to the driver 49 with respect to the face of the light conductor 36, whereby only light rays along the inclined direction of the strips 54 are allowed to pass. Further, a black, light absorbing member 55 such as tape or rubber is sticked (or in another manner) to an inner surface portion of the front glass 53 in a position corresponding to an extension of the above inclined direction.

In the device 45 of the present invention thus constructed, the light source 37 is turned ON when the surroundings are dark, for example, during the night and an internal light from the light source 37 is conducted toward the liquid crystal display element 21 by the light conductor 36, then passes through the display element 21 and is reflected by the reflecting plate 24. Consequently, the driver 49 can see a display image on the display element 21 through the reflecting plate 24. In this case, a portion of the internal light incident on the light conductor 36 passes through the semi-transmissible reflection member 52 and leaks also to the side opposite to the liquid crystal display element 21, namely, toward the light transmitting window 39. However, this leaking light is shielded against the driver 49 side by the strips 54 which are inclined toward the side opposite to the driver 49, so that the light advances only in the foregoing inclined direction. Then this light advancing in the inclined direction is absorbed by the light absorbing member 55 to prevent the front glass 54 from shining partially. The light absorbing member 55 is disposed on the portion of the front glass 53 corresponding to the extension in the inclined direction of the strips 54 and this portion is on a lower side of the front glass 53 usually not obstructing the sight of the driver 49, so there is no special obstacle to the driving.

On the other hand, during the daytime, an external light entering from the light transmitting window 39 is directed toward the liquid crystal display element 21, but since the strips 54 are disposed in the window 39, the external light is difficult to enter and the quantity of light entering the light conductor 36 is reduced. However, the external light is an extremely strong light as compared with the internal light emitted from the light source 37, so with only the light portion which has passed through the strips 54, it is sufficient to illuminate the liquid crystal display element 21, not affecting the brightness of display at all Although in the above construction the strips 54 are inclined toward the front glass 53, namely, on the side opposite to the driver 49, the strips 54 may be inclined right- and leftwards with respect to the driver 49 as shown in FIG. 7. Also in this case, the internal light leaking from the light transmitting window 39 is shielded against the driver 49 side by the strips 54 and it advances toward both ends in the longitudinal direction of the hood 47, whereby the light can be prevented from being reflected on the front glass 53 in front of the driver 49. As the construction comprising the arrangement of plural strips 54, a plurality of light shielding plates may be inclined at a predetermined angle in advance and molded together and the resulting integral body may be used as a louver. In this case, there is attained a simple construction in which the louver is merely fitted in the light transmitting window 39.

The angle of inclination and spacing of the strips 54 are set so that the internal light leaking from the light transmitting window 39 is shielded by the strips 54 and not directly seen by the driver 49 and so that the light absorbing member 55 disposed on the inner surface of the front glass 53 in the inclined direction of the strips does not obstruct the sight of the driver 49.

If the portion of the front glass 53 shone by the leaking internal light past the strips 54 and the louver is located in a position not sufficiently seen by the driver 49, the light absorbing member 55 may be omitted.

The light source 37 may be a normally ON type light source which is kept ON not only during the daytime but also during the night. Also in this case there can be obtained the same effect as above.

Figure 8:
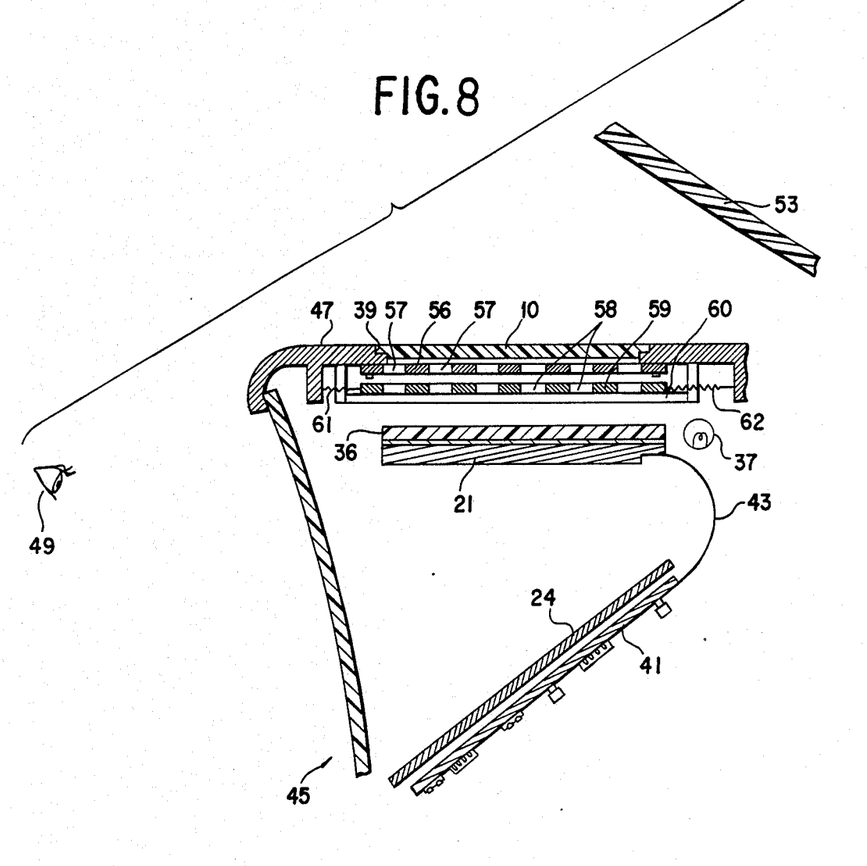
FIG. 8 is a sectional view of a principal portion of a liquid crystal display device according to a fourth embodiment of the present invention.

Referring now to FIG. 8, there is illustrated a fourth embodiment of the present invention, in which a transmission type liquid crystal display element 21 is disposed approximately horizontally in a vehicular front-side hood 47, and on a front face side of the display element 21 there is disposed a reflecting plate 24 opposedly and inclinedly at an angle of $\theta$ relative to the display element so that the driver 49 can see a display image on the display element 21 reflected by the reflecting plate 24. On a rear face side of the liquid crystal display element 21 is disposed a light conductor 36 whereby when a light source 37 is turned ON, for example, during the night, an internal light emitted from the light source 37 is conducted toward the display element 21. Further, a light transmitting window 39 for introducing an external light entering from a front glass 53 is formed in the hood 47 on an upper surface side of the light conductor 36, and a diffusion plate formed from resin glass is fitted in the light transmitting window 39.

Numeral 56 denotes a fixed plate having plural through holes 57 serving as a light transmitting portion, and a shutter 59 acting as a light transmission control member and having plural through holes 58 serving as a light transmitting portion is disposed under the fixed plate 56. The shutter 59 is held by a holding member 60 which is attached to the hood 47, and it is slidable right- and leftwards in the figure. Numeral 61 denotes a spring member for return which is fixed at both ends thereof to the shutter 59 and the hood 47, and numeral 62 denotes a spring member for movement which is fixed at both ends thereof to the shutter 59 and the hood 47 on the side opposite to the return spring member 61 and which is formed from a shape memory alloy.

The internal light source 37 is capable of emitting light so that the light is incident on the light conductor 36 and it turns ON when the driver 49 closes the vehicular lighting switch during the night. The light source 37 is disposed near the moving spring member 62 and it is constructed so that its generated heat is transmitted to the spring member 62.

In the device 45 of the present invention thus constructed, during the daytime, the light source 37 is OFF so there is no heat generation and the return spring member 61 draws the shutter 59 toward it against the moving spring member 62, so that the through holes 57 of the fixed plate 56 and the through holes 58 of the shutter 59 are communicated with each other. Consequently, mainly the light which has passed through the vehicular front glass 53 is applied to the light conductor 36 through the through holes 57 and 59. Then the light reaches the reflecting plate 24 through the liquid crystal display element 21 and the driver 49 can see a display image from the reflecting plate 24.

During the night, when the light source 37 turns ON, the light emitted from the light source 37 enters the light conductor 36, and while being reflected in the interior of the light conductor 36, it advances to the liquid crystal display element 21, thus permitting the driver 49 to see a display image like that during the daytime as described above. In this case, a portion of the internal light incident on the light conductor 36 passes through the diffusion plate 10 and leaks also to the side opposite to the liquid crystal display element 21, namely, the front glass 53 side.

Once the light source 37 turns ON, the moving spring member 62 formed of a shape memory alloy and disposed in a position close to the light source is heated and transformed into a prestored contracted shape, whereupon the return spring member 61 extends because it cannot withstand the force of the moving spring member 62 and the shutter 59 slides, so that the through holes 57 of the fixed plate 56 and the through holes 58 of the shutter 59 are not communicated with each other; in other words, the through holes 57 occupy positions other than the positions of the through holes 58 of the shutter 59, while the through holes 58 are positioned at other portions than the through holes 57 of the fixed plate 56, whereby both through holes are closed. Consequently, the light leaking upward from the light conductor 36 is prevented from reaching the vehicular front glass 53 by the shutter 59 and the fixed plate 56, whereby the conventional problem that the light reflected from the front glass 53 is seen by the driver 49, can be eliminated.

Although the moving spring member 62 formed of a shape memory alloy has been described above assuming that its shape is coil-like, any other shape may be adopted if only it can fulfill the same function. Further, the through holes 58 of the shutter 59 are provided suitably in conformity with the shape of the fixed plate 56. The shutter 59 and the moving spring member 62 may be connected directly or indirectly so as to permit the movement of the shutter 59 when the shape of at least the moving spring member 62 is changed by the heat of the light source 37.

A light shielding paint, e.g. black paint, may be applied to the portion of at least one side of the diffusion plate 10 except the portions corresponding to the through holes 57 of the fixed plate 56. In this case, the fixed plate 56 may be omitted.

According to the present invention, as set forth hereinabove, in a liquid crystal display device in which a reflecting plate is disposed inclinedly at a predetermined angle below a liquid crystal display element and light which has passed through the liquid crystal display element is reflected by the reflecting plate for seeing of the reflected display image, a first arm piece for fixing the liquid crystal display element and a second arm piece for fixing the reflecting plate are interconnected at their base portions to form a frame, and a printed circuit board which carries thereon the foregoing liquid crystal display element driving circuit connected electrically to the liquid crystal display element is fixed to the rear face side of the reflecting plate, whereby the angle between the reflecting plate and the liquid crystal display element can be set easily and this angle can be maintained constant without being changed by vibrations or distortions, so that the display image on the liquid crystal display element can be directed to the eyes of the observer at all times. Moreover, since the components of the liquid crystal display device are formed integrally with the frame, it is possible to easily effect positioning of the liquid crystal display device relative to the indicating instrument or indicator in which the liquid crystal display device is to be incorporated.

Besides, on the rear face side of the light conductor there are disposed a plurality of strips acting as a light transmission control member, approximately in parallel and inclinedly at an angle at which the internal light leaking from the light transmitting window to the light conductor surface can be shielded against the observer, whereby when the light source is turned ON at night, even if the internal light from the light source leaks from the light transmitting window through the light conductor, this leaking light is shielded by the inclined strips and thereby prevented from being seen by the observer, and since the light thus controlled for its advancing direction advances in a direction not obstructing the sight of the observer. Consequently, it is possible to provide a vehicular liquid crystal display device in which the light leaking from the light transmitting window for example is not a hindrance to the driving.

Further, a shutter having a light transmitting portion and serving as a light transmission control member is disposed on the rear face side of the light conductor, and a spring member for movement formed of a shape memory alloy and capable of controlling the position of the shutter is disposed near a light source which illuminates the liquid crystal display element through the light conductor, whereby when the light source is turned ON during the night for example, the shape of the moving spring member changes according to the heat of the light source, and according to this change the shutter moves to the position in which the internal light from the light source is prevented from leaking in a direction of obstruction to the observer's sight. Therefore, it is possible to provide a vehicular liquid crystal display device in which light leaking from the light transmitting window for example is not a hindrance to the driving. There is also the advantages that it is not necessary to newly provide a heater or the like because the heating for the shutter is effected by utilizing the heat generated by the emission of light in the light source.

What is claimed is:

1. A liquid crystal display device to reflect light which has passed through said liquid crystal display device comprising:
   a liquid crystal display element;
   a reflecting plate disposed below said liquid crystal display element and inclined relative to said element by a predetermined angle;
   first and second arm pieces having a base portion, free ends of said arm pieces extending at an angle $\theta$ from said base portion, said first and second arm pieces and said base portion together forming a frame;
   said liquid crystal display element fixed on said first arm piece and said reflecting plate fixed on said second arm piece;
   said liquid crystal display device further comprising:

a printed circuit board carrying thereon a liquid crystal display element driving circuit; and
said printed circuit board fixed on a rear surface of said reflecting plate.

2. A liquid crystal display device according to claim 1, wherein said frame is secured together by bolts.

3. A liquid crystal display device according to claim 1, characterized by being a vehicular indicating instrument in which when the surroundings are light, for example, during the daytime, an external light incident through a front glass is introduced from said light transmitting window, while when the surroundings are dark, for example, during the night, an internal light emitted from said light source is directed to said liquid crystal display element through said light conductor to thereby illuminate the display element.

4. A liquid crystal display device in which a light conductor is disposed on a rear surface of a transmission type liquid crystal display element, said liquid crystal display element being illuminated through said light conductor by an internal light emitted from a light source or by an external light entering from a light transmitting window provided above said light conductor, and light which has passed through said liquid crystal display element being reflected by a reflecting plate which is disposed below said liquid crystal display element inclinedly at a predetermined angle and a display image thus reflected being seen, characterized in that a light transmission control member is disposed on a rear surface of said light conductor so that the internal light leaking from said light transmitting window toward the surface of said light conductor can be shielded from the observer side.

5. A liquid crystal display device according to claim 4, wherein said light transmission control member comprises a plurality of strips arranged approximately in parallel and inclined at an angle at which the internal light leaking from said light transmitting window toward said light conductor surface can be shielded from the observer side.

6. A liquid crystal display device according to claim 5, wherein said plural strips are inclined toward the side opposite to the observer.

7. A liquid crystal display device according to claim 5, wherein said plural strips are inclined right- and leftwards with respect to the observer.

8. A liquid crystal display device according to claim 4, wherein said light transmission control member is a shutter disposed on a rear surface of said light conductor and having a light transmitting portion, and wherein a spring member for movement formed from a shape memory alloy is disposed near said light source, said spring member for movement being connected to said shutter and capable of controlling the position of said shutter so that the external light is incident on said light conductor through said light transmitting portion when said light source is OFF and the internal light emitted from said light source does not leak from said light transmitting portion when said light source is ON.

9. A liquid crystal display device according to claim 4, characterized by being a vehicular indicating instrument in which when the surroundings are light, for example, during the daytime, an external light incident through a front glass is introduced from said light transmitting window, while when the surroundings are dark, for example, during the night, an internal light emitted from said light source is directed to said liquid crystal display element through said light conductor to thereby illuminate the display element.

* * * * *